UNITED STATES PATENT OFFICE.

BERNHARD JAECKEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

YELLOWISH-BROWN SULFUR DYE.

No. 896,916.        Specification of Letters Patent.        Patented Aug. 25, 1908.

Application filed April 8, 1908. Serial No. 425,846.

*To all whom it may concern:*

Be it known that I, BERNHARD JAECKEL, doctor of philosophy, chemist, citizen of the German Empire, residing at Elberfeld, Germany, Kingdom of Prussia, have invented new and useful Improvements in Yellowish-Brown Sulfur Dyes, of which the following is a specification.

Another application for Letters Patent of same date concerns the manufacture and production of new yellowish-brown to orange sulfur-dyestuffs which can be obtained by heating with sulfur: mixtures of meta-diamins alkylated in the aromatic nucleus with nitroamins or derivatives thereof the one of which components must be alkylated in the aromatic nucleus and transforming the sulfid colors into soluble compounds by heating them with alkaline sulfids. I have now found that dyes giving a yellower shade are obtained by carrying out the process in the presence of benzidin or its derivatives.

The new dyestuffs are after being dried and pulverized yellowish-brown powders practically insoluble in pure water, but soluble in water in the presence of sodium sulfid with a yellowish-brown color and hardly soluble in dilute caustic soda lye with a yellowish-brown color.

In order to illustrate the new process more fully the following example is given, the parts being by weight: 108 parts of meta-toluylenediamin, together with 60 parts of meta-nitranilin, 60 parts of benzidin and 600 parts of sulfur, are heated to 240-250° C. for 12 hours. When cold the melt is pulverized and is heated to from 80 to 100° C. with 450 parts of a 100 per cent. solution of sodium sulfid and 2000 parts of water until a clear solution results. The mixture is then diluted with water and the dyestuff is precipitated with dilute acids. It is filtered off, dried and ground.

My new dyestuff is after being dried and pulverized a yellowish-brown powder which is practically insoluble in pure water, but soluble in water in the presence of sodium sulfid with a yellowish-brown color, it is hardly soluble in dilute caustic soda lye with a yellowish-brown color and practically insoluble in concentrated sulfuric acid (66° Baumé). It dyes unmordanted cotton in a bath of sodium sulfid orange-yellow shades.

The process is carried out in an analogous manner on using other of the above mentioned mixtures.

The same dyestuffs can be obtained by replacing the nitroamino-compounds by the corresponding dinitro compounds or by heating with sulfur and benzidin compounds: mixtures of meta-diamins or triamins (derived from meta-diamins) or their derivatives with nitroamins alkylated in the aromatic nucleus or with the respective polynitrocompounds and transforming the sulfid colors thus produced into soluble compounds by heating them with alkaline sulfids.

Having thus described my invention and in what manner the same is performed, what I claim as new, and desire to secure by Letters Patent, is:—

1. The herein-described new sulfur dyestuffs resulting from the reaction of sulfur on a mixture of aromatic meta-diamins with nitroamins the one of which components must be alkylated in the aromatic nucleus, and benzidin compounds, which are after being dried and pulverized yellowish-brown powders practically insoluble in pure water but soluble in water in the presence of sodium sulfid with a yellowish-brown color, hardly soluble in dilute caustic soda lye with a yellowish-brown color; and which dye unmordanted cotton in a bath containing sodium sulfid from yellow to orange shades, substantially as hereinbefore described.

2. The herein-described new sulfur dyestuff resulting from the reaction of sulfur on a mixture of meta-toluylenediamin with meta-nitranilin and benzidin, which is after being dried and pulverized a yellowish-brown powder insoluble in pure water but soluble in water in the presence of sodium sulfid with a yellowish-brown color hardly soluble in dilute caustic soda lye with a yellowish-brown color and practically insoluble in concentrated sulfuric acid, and which dyes unmordanted cotton in a bath containing sodium sulfid orange-yellow shades, substantially as hereinbefore described.

In testimony whereof I have hereunto set my hand in the presence of two subscribing witnesses.

BERNHARD JAECKEL. [L. S.]

Witnesses:
  OTTO KÖNIG,
  WM. WASHINGTON BRUNSWICK.